United States Patent [19]
Sumi

[11] Patent Number: 6,099,789
[45] Date of Patent: Aug. 8, 2000

[54] MOLDED ARTICLE LAMINATED WITH HEAT INSULATING SHEET MEMBER AND PRODUCTION PROCESS THEREFOR

[75] Inventor: Takehiko Sumi, Ebina, Japan

[73] Assignee: Kyoraku Co., Ltd., Kyoto, Japan

[21] Appl. No.: 09/296,478

[22] Filed: Apr. 22, 1999

Related U.S. Application Data

[62] Division of application No. 08/975,616, Nov. 21, 1997.

[30] Foreign Application Priority Data

Nov. 26, 1996 [JP] Japan ..................................... 8-330245

[51] Int. Cl.[7] .......................... B29C 45/14; B29C 45/16; B29C 45/32; B29C 49/06; B29D 22/00
[52] U.S. Cl. .......................... 264/516; 264/523; 264/528; 264/529; 428/36.1; 428/36.4; 428/36.8
[58] Field of Search .................................. 428/36.1, 36.2, 428/36.4, 36.91; 264/454, 460, 478, 513, 516, 509, 510, 511, 512, 514, 523, 526, 528, 529, 530, 535, 537, 540, 543

[56] References Cited

U.S. PATENT DOCUMENTS

| | | | |
|---|---|---|---|
| 4,510,105 | 4/1985 | Sherwood | 264/46.6 |
| 5,114,767 | 5/1992 | Berns et al. | 428/35.7 |
| 5,529,826 | 6/1996 | Tailor et al. | 428/110 |
| 5,635,226 | 6/1997 | Koda et al. | 425/529 |
| 5,847,041 | 12/1998 | Takemura et al. | 524/504 |

FOREIGN PATENT DOCUMENTS 57-185120  11/1982  Japan .

*Primary Examiner*—Ellis Robinson
*Assistant Examiner*—John J. Figueroa
*Attorney, Agent, or Firm*—Hickman Stephens Coleman & Hughes, LLP

[57] ABSTRACT

A molded article includes a hollow molded body formed of a base material and a heat insulating sheet member laminated to an outer surface of the hollow molded body. The base material is a blended material which contains about 50% by weight to about 90% by weight of a thermoplastic resin and about 10% by weight to about 50% by weight of an inorganic material, and has a flexural rigidity of at least about 1,350 MPa at 23° C. and a flexural rigidity of at least about 550 MPa at 60° C. A process for producing a molded article includes placing a heat insulating sheet member on a surface of a mold cavity of at least one mold half of separated mold halves, inserting a parison formed of a blended material having the above-described composition and flexural rigidity characteristics between the mold halves, clamping the mold halves, and introducing a pressurized fluid into the parison to inflate the parison in conformity with a shape of the mold cavity and bond the heat insulating sheet member thereto, to produce a molded article including a hollow molded body having a heat insulating sheet member laminated to an outer surface thereof.

5 Claims, 3 Drawing Sheets

MOLDED ARTICLE LAMINATED WITH HEAT INSULATING SHEET MEMBER AND PRODUCTION PROCESS THEREFOR

This is a Divisional application of copending prior U.S. application Ser. No. 08/975,616 filed on Nov. 21, 1997, pending, which claims priority of now copending Japanese Patent Application No. 8-330245, filed Nov. 26, 1996, the disclosure of which is incorporated herein by reference.

CLAIM OF FOREIGN PRIORITY

This application claims priority under 35 U.S.C. § 119 from Japanese Patent Application No. 8-330245 filed on Nov. 26, 1996, which is incorporated herein by reference for all purposes.

BACKGROUND OF THE INVENTION

The present invention relates generally to molded articles and, more particularly, to molded articles laminated with a heat insulating sheet member and a process for producing such molded articles.

An example of a molded article having a heat insulating sheet member, such as cloth, which is laminated to the outer surface of the article in the molding process is disclosed in Japanese Patent Laid-Open Publication No. 57-185120. This molded article is produced by a blow molding process in which a fiber sheet is placed on the outer surface of the mold.

A molded article which has a heat insulating sheet member, such as cloth, laminated to the outer surface thereof has a beautiful appearance and superb feel, which are important characteristics of a successful commercial product. It is difficult, however, to produce such an article integrally by means of a blow molding process because of problems associated with cooling of the molded article.

In general, there are two types of blow molding processes. In the first type the heat of the parison, i.e., the molten material to be subjected to blow molding, is externally removed by means of a mold. In the second type the heat of the parison is internally removed by blowing air inside the wall of the molded article. The most effective method for cooling the molded article is external cooling in which the wall of the molded article is cooled by means of a mold. In the case where a molded hollow article has a heat insulating sheet member, such as cloth, laminated to the outer surface thereof, however, a longer period of time is required for cooling because the heat insulating sheet member interposed between the molded article and the mold impedes the transfer of heat from the molded article to the mold. As a result, the molding cycle is rendered inefficient. If a molded article having such a laminate is released from a mold after the same period of time as for a molded article without such a laminate, then such molded article is not sufficiently cooled before the mold is opened. This insufficient cooling causes shrinkage-induced deformation of the molded article to occur on standing after the molded article is released from the mold. Shrinkage-induced deformation is especially problematic when the heat insulating sheet member is formed on one side of the molded article. In this case, the wall onto which the heat insulating sheet member is laminated shrinks on standing after release from the mold due to insufficient cooling, whereas the wall or walls without a heat insulating sheet member laminated thereto do not shrink on standing after release from the mold because they have been sufficiently cooled in the mold. The shrinkage differential between the wall onto which the heat insulating sheet member is laminated and the wall or walls without a heat insulating sheet member laminated thereto causes deformation to occur in the molded article.

In view of the foregoing, what is needed is a molded article having a heat insulating sheet member laminated thereto which can be sufficiently cooled by means of the mold within the mold cycle for a molded article without such a laminate, as well as a process for producing such a molded article.

SUMMARY OF THE INVENTION

Broadly speaking, the present invention fills these needs by providing a molded article having a heat insulating sheet member laminated thereto which can be cooled in a relatively short period of time without substantial deformation. The present invention also provides a process for producing such a molded article.

In accordance with one aspect of the present invention, a molded article is provided. The molded article includes a hollow molded body formed of a base material and a heat insulating sheet member laminated to an outer surface of the hollow molded body. The base material is comprised of about 50% by weight to about 90% by weight of a thermoplastic resin and about 10% by weight to about 50% by weight of an inorganic material, and has a flexural rigidity of at least about 1,350 MPa at 23° C. and a flexural rigidity of at least about 550 MPa at 60° C. In a preferred embodiment, the base material is comprised of about 50% by weight to about 80% by weight of the thermoplastic resin and about 20% by weight to about 50% by weight of the inorganic material.

The thermoplastic resin is preferably high density polyethylene, polypropylene, polystyrene, polyethylene terephthalate, polybutylene terephthalate, polycarbonate, acrylonitorile-butadiene-styrene, acrylonitrile-(ethylene+propylene+dienn terpolymer)-styrene, or modified polyphenylene ether. The inorganic material is preferably talc, mica, calcium carbonate, or glass fiber. The heat insulating sheet member is preferably cloth having fibers of cotton, hemp, wool, silk, viscose rayon, cupro-ammonium rayon, acetate, triacetate, nylon, polyester, acrylic, vinylon, polypropylene, polyurethane, or blends thereof.

In accordance with another aspect of the present invention, a process for producing a molded article is provided. A heat insulating sheet member is placed on a surface of a mold cavity of at least one mold half of separated mold halves. A parison is then inserted between the mold halves. The parison is preferably comprised of a blended material having the composition and flexural rigidity characteristics of the base material of the molded article of the present invention, as described above. Next, the mold halves are clamped. Finally, a pressurized fluid, e.g., air, is introduced into the parison to inflate the parison in conformity with a shape of the mold cavity and bond the heat insulating sheet member thereto, whereby a molded article comprising a hollow molded body having a heat insulating sheet member laminated to an outer surface thereof is produced.

The features of the molded article of the present invention provide at least two significant advantages. First, the inorganic material incorporated into the thermoplastic resin increases the heat transfer rate within the thermoplastic resin such that the molded article, which has a heat insulating sheet member laminated thereto, can be sufficiently cooled by means of the mold in a relatively short period of time, i.e., within the mold cycle for a molded article without such a laminate. Second, the high rigidity of the base material from which the molded article is formed prevents the molded article from undergoing substantial deformation after being released from the mold.

These and other features and advantages of the present invention will become apparent upon reading the following detailed description and studying the various figures of the drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

The preferred embodiments of the present invention will now be described in detail with reference to the accompanying drawings.

Figure 1:
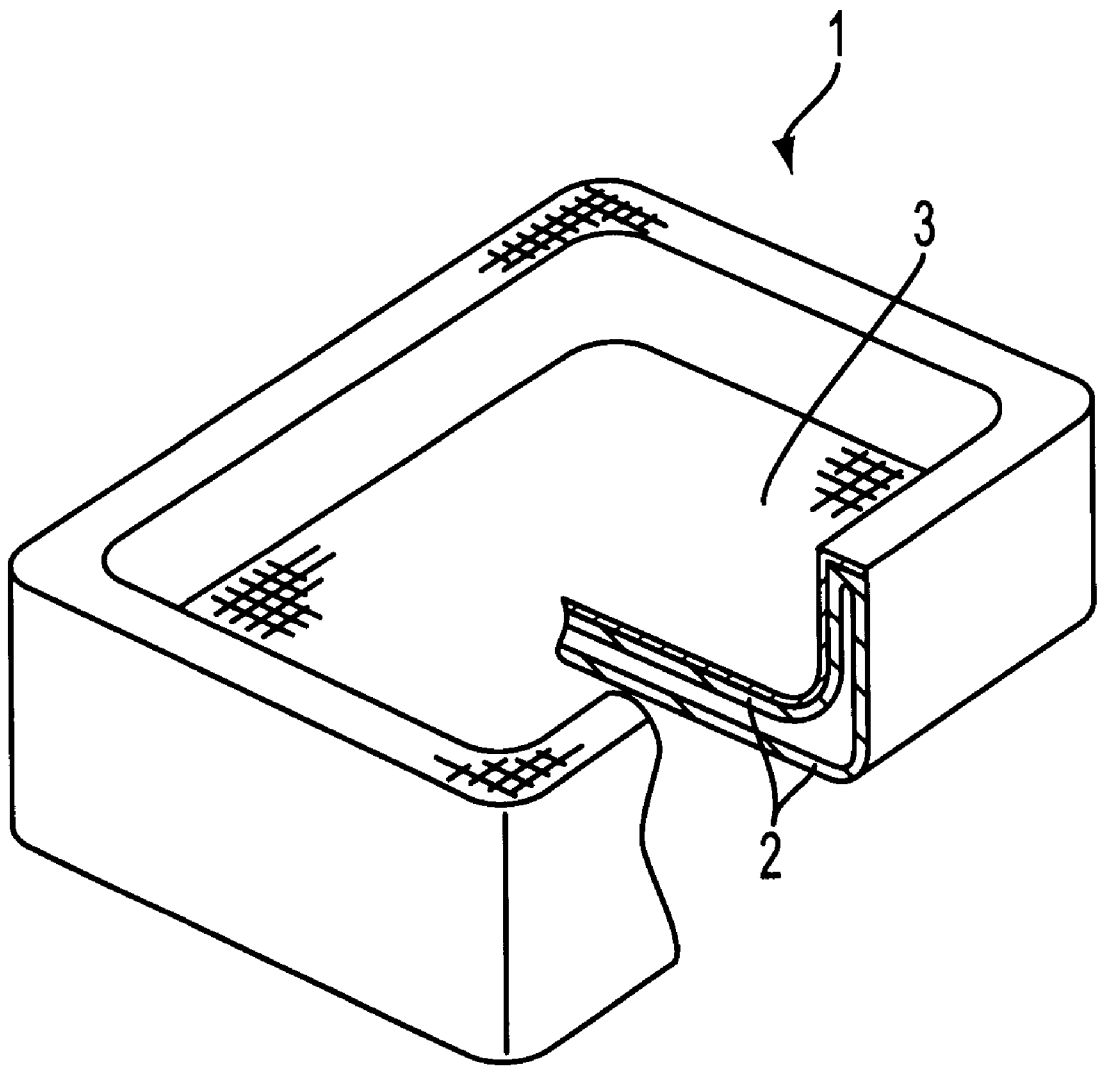
FIG. 1 shows a partially cutaway, perspective view of a molded article having a heat insulating sheet member laminated thereto in accordance with the present invention.

FIG. 1 shows a molded article having a heat insulating sheet member laminated thereto. As shown therein, molded article 1 is a hollow molded body which includes base material 2 and heat insulating sheet member 3.

In accordance with the invention, base material 2 is a blended material comprised of about 50% by weight to about 90% by weight of a thermoplastic resin and about 10% by weight to about 50% by weight of an inorganic material. Further, base material 2 has a flexural rigidity of at least about 1,350 MPa at 23° C. and a flexural rigidity of at least about 550 MPa at 60° C. As used in connection with the description of the invention, the term "flexural rigidity" refers to a value measured in accordance with the procedure specified in JIS (Japan Industrial Standard) K 7231. In a preferred embodiment, base material 2 is comprised of about 50% by weight to about 80% by weight of the thermoplastic resin and about 20% by weight to about 50% by weight of the inorganic material.

The thermoplastic resin used in the blended material may be any thermoplastic resin capable of being blow molded. By way of example, preferred thermoplastic resins include high density polyethylene, polypropylene, polystyrene, polyethylene terephthalate, polybutylene terephthalate, acrylonitorile-butadiene-styrene, acrylonitrile-(ethylene+propylene+dienn terpolymer)-stylene, and engineering plastics, e.g., polycarbonate and modified polyphenylene ether.

The inorganic material used in the blended material is not particularly restricted. Examples of the inorganic material to be blended into the base material include oxides of metals such as aluminum, copper, iron, lead, nickel, magnesium, calcium, barium, zinc, zirconium, molybdenum, silicon, antimony and titanium; hydrated products thereof (hydroxides); compounds such as sulfates, carbonates and silicates thereof; complex salts thereof; and mixtures of the foregoing. Preferred examples include aluminum oxide (alumina), aluminum hydroxide, calcium hydroxide, magnesium oxide (magnesia), magnesium hydroxide, zinc oxide (zinc white), oxides of lead such as red lead and white lead, magnesium carbonate, calcium carbonate, basic magnesium carbonate, white carbon, asbestos, mica, talc, glass fibers, glass powder, glass beads, clay, diatomaceous earth, silica, wollastonite, iron oxide, antimony oxide, titanium oxide (titania), lithopone, pumice powder, calcium sulfate (e.g., gypsum), zirconium silicate, zirconium oxide, barium carbonate, dolomite, molybdenum disulfide, and iron sand. Among the foregoing examples, talc, mica, calcium carbonate, and glass fibers are particularly preferred.

Heat insulating sheet member 3 is preferably formed of cloth. The cloth, e.g., knitted fabrics, woven fabrics, and non-woven fabrics, may include natural fibers such as cotton, hemp, wool, and silk; regenerated fibers such as viscose rayon and cupro-ammonium rayon; semi-synthetic fibers such as acetate and triacetate; synthetic fibers such as nylon, polyester, acrylic, vinylon, polypropylene, and polyurethane; and blends of these fibers. Heat insulating sheet member 3 also may be a foamed sheet in the shape of a plate made by expanding a synthetic resin such as polyurethane, polyvinyl chloride, polyamide, and polystyrene, or a rubber such as a latex. The foamed sheet should have a heat insulating portion, e.g., cells for foams therein, so as to provide a heat insulating function.

It has been unexpectedly found that a hollow molded body formed by blow molding of a thermoplastic resin blended with about 10% by weight to about 50% by weight of an inorganic material, e.g., talc, mica, calcium carbonate, or glass fiber, can be effectively cooled down by means of a mold. Although the mechanism by which the inorganic material increases the cooling efficiency in external cooling, such as cooling by means of a mold, is not fully a understood, the mechanism is believed to be as set forth in the following discussion.

In a general blow molding process, cooling is effected by transferring heat from the molten thermoplastic resin to a cooled mold. As described above, however, when cooling a molded article laminated with a heat insulating sheet member, e.g., cloth, as in the case of the molded article of the present invention, the transfer of heat from the thermoplastic resin to the mold is hindered by the heat insulating sheet member, which thermally isolates the thermoplastic resin from the mold. Thus, the thermoforming of a molded article having such a laminate has a disadvantage in cooling, which renders the molding cycle inefficient. For this reason, designers have been reluctant to use or produce a molded article laminated with a heat insulating sheet member.

Meanwhile, it is evident that the transfer of heat by a synthetic resin is accomplished by the sequential transfer of heat within the synthetic resin. The cooling of the molten resin starts with the molten resin in contact with the mold and proceeds as the cooled region shifts toward the center of the resin until the innermost side of the resin wall is cooled thereby completing the cooling process. In other words, the cooling process proceeds by the transfer of heat within the synthetic resin. The heat transfer rate within the synthetic resin, however, is significantly slower than the heat transfer rate within the mold. Consequently, even if the mold is effectively cooled, the overall heat transfer rate for the molded article is limited by the relatively slow heat transfer rate within the resin. Thus, the efficiency of the cooling of a molded article depends on the heat transfer rate within the resin.

The problem of poor heat transfer efficiency encountered during blow molding of a molded article laminated with a heat insulating sheet member, e.g., cloth, has been hitherto regarded as being caused by the presence of the heat insulating sheet member. It has been found, however, that the cooling efficiency is practically determined by the heat transfer efficiency of the resin and not by the heat insulating sheet member. It has been further found that when inorganic materials which have a higher heat transfer efficiency than the resin are blended into the resin, the inorganic materials increase the heat transfer rate of the resin so that a molded article laminated with a heat insulating sheet member can be formed by blow molding without encountering significant problems associated with poor heat transfer efficiency.

In the present invention, the thermoplastic resin is blended with about 10% by weight to about 50% by weight of a specific inorganic material. The inorganic material has a heat conductivity which is significantly higher than that of the thermoplastic resin. The amount of the inorganic material included in the thermoplastic resin is selected so that the cooling efficiency within the resin is sufficient to take away the heat of the resin via the mold, even in the presence of a heat insulating sheet member between the mold and the resin. Although a higher cooling efficiency can be achieved by blending a higher proportion of the inorganic material in the thermoplastic resin, the amount of the inorganic material included in the resin is preferably not more than about 50% by weight because a higher inorganic material content impairs the elongation of the blended material composed of the resin and the inorganic material which adversely affects the blow molding processability of the blended material.

Another feature of the present invention is the increase in the rigidity of the resin which results from the incorporation of an inorganic material. Heat decreases the rigidity of the resin so that internal forces may deform the resin. A resin which is blended with an inorganic material that increases the rigidity of the resin can be cooled without substantial deformation. In particular, when a molded article formed of a resin blended with an inorganic material is left to stand after leaving the mold at a temperature which is higher than the temperature at which a molded article leaves the mold in a conventional blow molding process, the molded article is substantially free from deformation because the incorporated inorganic material not only prevents any decrease in the rigidity of the resin at the time the resin is heated but also increases the rigidity of the resin.

Figure 2:
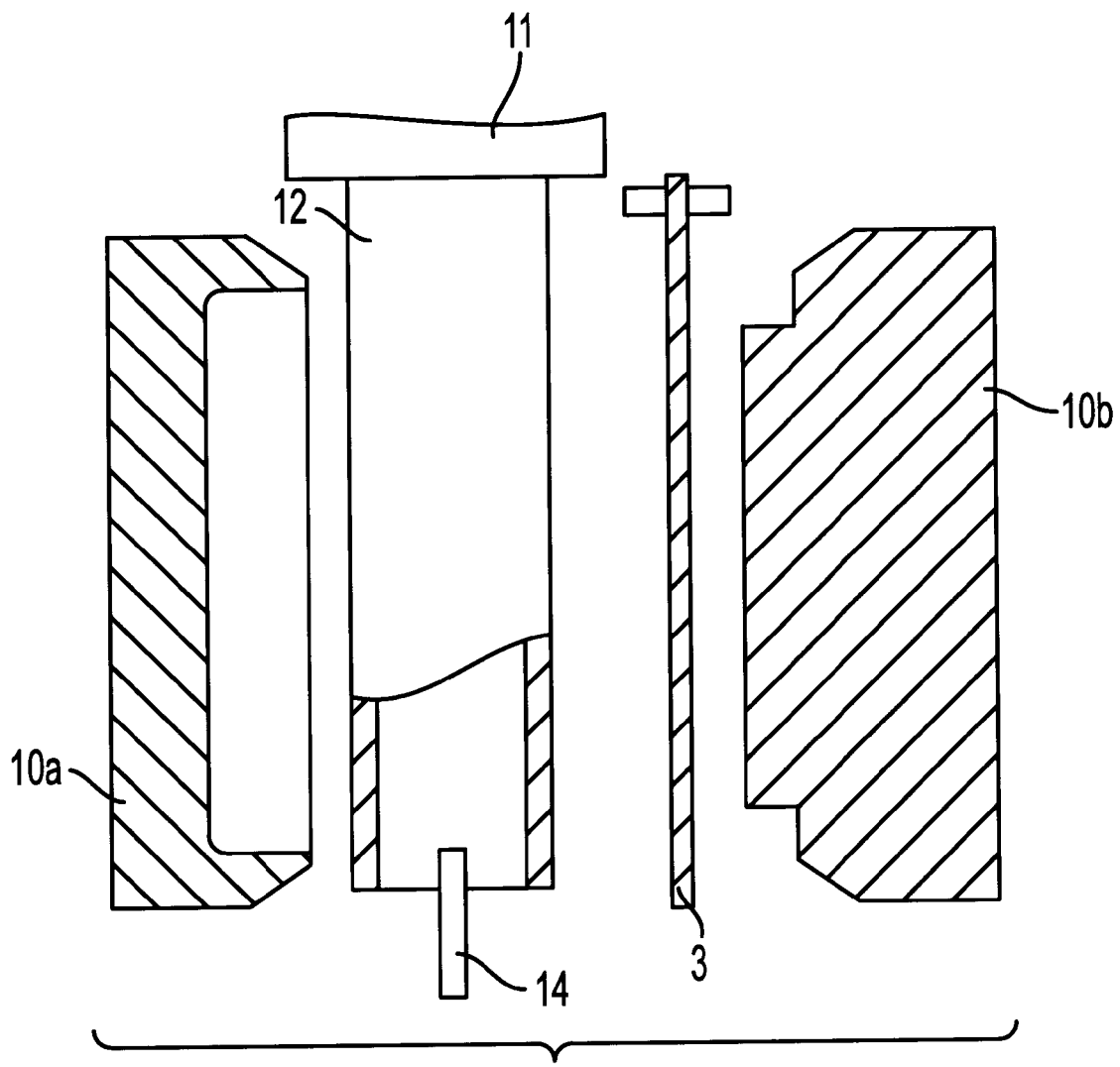
FIG. 2 shows a cross sectional view of a mold which illustrates the method of producing a molded article of the present invention.

The process for producing a molded article of the present invention will now be described with reference to FIG. 2. As shown in FIG. 2, a tubular parison 12 that is extruded from die 11 is positioned between separated mold halves 10a and 10b. Heat insulating sheet member 3 is positioned between mold half 10b and parison 12. Nozzle 14 for blowing pressurized fluid, e.g., air, into parison 12 is positioned beneath parison 12.

Parison 12 may be prepared by means of blending using an extruder. In the blending and extruding procedure, a preblended material containing a thermoplastic synthetic resin, e.g., a polypropylene-based block copolymer, and an inorganic material, e.g., talc, in the above-described amounts is loaded in the hopper of an extruder. The blended material is then plasticized by heating and melted in the extruder, which is driven by a screw. The blending is performed by means of a cylindrical member and the screw inserted therein. A motor rotates the screw at a constant speed. The temperature of the blend within the cylindrical member is generally in the range of 200° C. to 300° C. so that the thermoplastic resin is in a molten state. Those skilled in the art will recognize that the temperature of the blend may vary depending on the type of resin.

The inorganic material, e.g., talc, has a melting point which is significantly higher than the temperature of the blend in the cylindrical member and, therefore, does not melt within the cylindrical member and retains its original shape. It is important that the melt-blending operation is sufficiently performed so that the inorganic material is substantially uniformly mixed in the thermoplastic synthetic resin. In addition, the surface of the screw should have a high hardness sufficient to withstand the wear caused by the abrasive action of the inorganic material. It should be noted that a screw having a low surface hardness will have a very short service life.

The preblended material which is loaded in the hopper of the extruder should be as homogeneous as possible because the particle size of the thermoplastic resin differs greatly from that of the inorganic material, i.e., the thermoplastic resin and the inorganic material have different bulk densities. To overcome the blending problems which stem from the difference in bulk density between the thermoplastic resin and the inorganic material, a mechanically effective blender, e.g., a tumbler, is used to prepare a homogeneous preblended material for loading into the hopper of the extruder. Alternatively, instead of blending the thermoplastic resin and the inorganic material in the extruder, a master batch prepared by blending the inorganic material into the resin in advance by means of a Banbury mixer or twin-screw extruder may be used.

EXAMPLES

The present invention will now be described with reference to specific examples. It should be borne in mind that the examples given below are merely illustrative of particular applications of the molded article and method of producing a molded article of the present invention and should in no way be construed to limit the usefulness of the invention in other applications.

Figure 3:
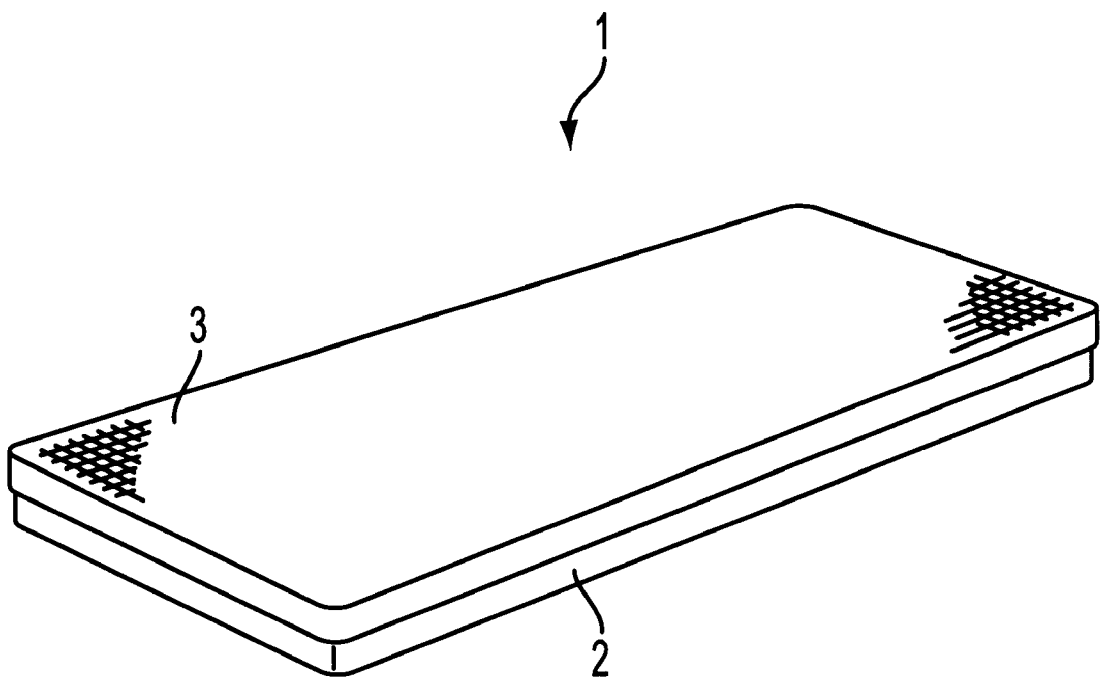
FIG. 3 is a perspective view of a plate-like body used to evaluate preferred embodiments of the present invention.

Using a twin-screw extruder, mixtures having the formulations shown in Table 1 were pelletized. The pellets were heated and melt-blended in an extruder having a screw diameter of 70 mm so that the extrusion head formed a tubular parison, which was extruded into the space between separated mold halves. The mold halves create a cavity designed for the formation of a plate-like hollow molded body measuring 700 mm×300 mm×30 mm in width, length, and height, respectively, as illustrated in FIG. 3. The mold halves are mounted on a clamping apparatus having a clamping force of 70 tons. A needle-punched, non-woven polyester fabric having a thickness of 6 mm and weight of 350 g/m² was placed in the cavity of one of the mold halves in a manner such that the upper part of the non-woven fabric was temporarily fixed. The surface of the non-woven fabric included a plurality of ring-shaped polyester fibers. The surface of the polyester fibers were roughened. By use of the above-mentioned apparatus and arrangement, the mold halves were clamped and pressurized air of 6 kg/cm was introduced into the parison to carry out the extrusion-blow molding operation.

In the formulations shown in Table 1, the blended material includes a base material and an inorganic material. The following polypropylene-based block copolymer (abbreviated as "PP") and high density polyethylenes (abbreviated as "PE1" and "PE2") were used as the thermoplastic resin constituting the base material in the blended material formulations shown in Table 1.

PP: "EC9," available from Nippon Polychem Co., Ltd. Flexural rigidity (at 23° C.): 1,200 MPa PE1: "Suntec HD, B470," available from Asahi Chemical Industry Co., Ltd. Flexural rigidity (at 23° C.): 1,100 MPa PE2: "Jaleks HD, S4002," available from Nippon Polyolefin Co., Ltd. Flexural rigidity (at 23° C.): 780 MPa The inorganic material used in the blended material formulations shown in Table 1 was talc having an average particle diameter of 100 μm or less.

TABLE 1

| | Blended material (% by weight) | | | | Flexural rigidity (MPa) | |
|---|---|---|---|---|---|---|
| | Base material | | | Inorganic Material | | |
| | PP | PE1 | PE2 | Talc | 23° C. | 60° C. |
| Example 1 | 95 | | | 5 | 1290 | 490 |
| Example 2 | 90 | | | 10 | 1480 | 560 |
| Example 3 | 80 | | | 20 | 2150 | 850 |
| Example 4 | 70 | | | 30 | 3050 | 1160 |
| Example 5 | 60 | | | 40 | 4410 | 1720 |
| Example 6 | 50 | | | 50 | 6100 | 2320 |
| Example 7 | 40 | | | 60 | 7850 | 3000 |
| Example 8 | | 95 | | 5 | 1180 | 480 |
| Example 9 | | 90 | | 10 | 1350 | 555 |
| Example 10 | | 80 | | 20 | 2050 | 840 |
| Example 11 | | 70 | | 30 | 2800 | 1150 |
| Example 12 | | 60 | | 40 | 4100 | 1700 |
| Example 13 | | 50 | | 50 | 5600 | 2300 |
| Example 14 | | 40 | | 60 | 7200 | 2950 |
| Example 15 | | | 95 | 5 | 840 | 350 |
| Example 16 | | | 90 | 10 | 960 | 400 |
| Bxample 17 | | | 80 | 20 | 1350 | 550 |
| Example 18 | | | 70 | 30 | 1980 | 820 |
| Example 19 | | | 60 | 40 | 2870 | 1150 |
| Example 20 | | | 50 | 50 | 4000 | 1640 |
| Example 21 | | | 40 | 60 | 5100 | 2100 |

In Tables 2–4, the cooling time means the time span measured between the start of the blowing in of the pressurized air and the release of the molded article from the mold. After being released from the mold, the molded article was left in a free state for 1 hour at room temperature (23° C.) and then the deformation of the molded article was measured. The side of the molded article on which the heat insulating sheet member is disposed becomes concave as the result of deformation. Accordingly, the molded article was placed on a level plate in such a manner that the side on which the heat insulating sheet member was disposed faced downward, wherein the amount of deformation (mm) was defined as the height of the molded article from the surface of the level plate in the approximate center of the molded article minus the height from the surface of the level plate at the end of the molded article. For the evaluation of moldability, defects, e.g., pinholes and extremely thin walls, were visually inspected.

In Tables 2–4, the moldability rating designated by "X" means that a hollow molded article could not be obtained and that the mold was opened because the pressure necessary for blow molding could not be attained because of pinholes locally generated due to the lack of elongation of the blended material. The articles for which the deformation could not be measured because of pinholes are designated by the symbol "-" in the column showing the deformation measurements. The evaluation rating designated by "O" means that an acceptable product having either no or slight deformation was formed. The evaluation rating designated by "Δ" means that the product has some deformation but can still be used. The evaluation rating designated by "X" means that the product has substantial deformation and cannot be used.

TABLE 2

| | Blended material (% by weight) | | | | | |
|---|---|---|---|---|---|---|
| | Base material PP | Inorganic material Talc | Cooling Time (minute) | Deformation (mm) | Moldability | Evaluation |
| Example 1-1 | 95 | 5 | 1 | 3 | ○ | X |
| Example 1-2 | 95 | 5 | 2 | 3 | ○ | X |
| Example 1-3 | 95 | 5 | 3 | 2 | ○ | X |
| Example 1-4 | 95 | 5 | 4 | 1 | ○ | ○ |
| Example 2-1 | 90 | 10 | 1 | 1.5 | ○ | Δ |
| Example 2-2 | 90 | 10 | 2 | 1 | ○ | ○ |
| Example 2-3 | 90 | 10 | 3 | 0 | ○ | ○ |
| Example 2-4 | 90 | 10 | 4 | 0 | ○ | ○ |
| Example 3-1 | 80 | 20 | 1 | 1 | ○ | ○ |
| Example 3-2 | 80 | 20 | 2 | 0 | ○ | ○ |
| Example 3-3 | 80 | 20 | 3 | 0 | ○ | ○ |
| Example 3-4 | 80 | 20 | 4 | 0 | ○ | ○ |
| Example 4-1 | 70 | 30 | 1 | 1 | ○ | ○ |
| Example 4-2 | 70 | 30 | 2 | 0 | ○ | ○ |
| Example 4-3 | 70 | 30 | 3 | 0 | ○ | ○ |
| Example 4-4 | 70 | 30 | 4 | 0 | ○ | ○ |
| Example 5-1 | 60 | 40 | 1 | 0 | ○ | ○ |
| Example 5-2 | 60 | 40 | 2 | 0 | ○ | ○ |
| Example 5-3 | 60 | 40 | 3 | 0 | ○ | ○ |
| Example 5-4 | 60 | 40 | 4 | 0 | ○ | ○ |
| Example 6-1 | 50 | 50 | 1 | 0 | ○ | ○ |
| Example 6-2 | 50 | 50 | 2 | 0 | ○ | ○ |
| Example 6-3 | 50 | 50 | 3 | 0 | ○ | ○ |
| Example 6-4 | 50 | 50 | 4 | 0 | ○ | ○ |

TABLE 2-continued

|  | Blended material (% by weight) | | Cooling Time (minute) | Deformation (mm) | Moldability | Evaluation |
| --- | --- | --- | --- | --- | --- | --- |
|  | Base material PP | Inorganic material Talc |  |  |  |  |
| Example 7-1 | 40 | 60 | 1 | — | X | X |
| Example 7-2 | 40 | 60 | 2 | — | X | X |
| Example 7-3 | 40 | 60 | 3 | — | X | X |
| Example 7-4 | 40 | 60 | 4 | — | X | X |

As is apparent from Table 2, the molded article made from a blended material containing PP and 10% by weight to 50% by weight of talc exhibits a deformation of 1.5 mm or less in a cooling time period of 1 minute. Generally, in the case of a molded article of this size, the criterion for an acceptable deformation is 1.5 mm or less, while the cooling time is required to be 1 minute or less because of productivity requirements. Accordingly, the acceptance criterion regarding deformation was set as 1.5 mm in a cooling time of 1 minute.

As is further apparent from Table 2, the molded article is substantially deformed when the flexural rigidity of the blended material is 1290 MPa at 23° C. and 490 MPa at 60° C. (see, e.g., Examples 1-1 to 1-3). When the flexural rigidity of the blended material is at least about 1480 MPa at 23° C. and at least about 550 MPa at 60° C., however, deformation of the molded article after release from the mold is within an acceptable range (see, e.g., Examples 2-1, 3-1, and 4-1).

Table 3 shows the evaluation of molded articles which use PE1 as the thermoplastic resin instead of PP as shown in Table 2. As is apparent from Table 3, the molded article made from a blended material containing PE1 and 10% by weight to 50% by weight of talc exhibits a deformation of 1.5 mm or less in a cooling time period of 1 minute. As is further apparent from Table 3, the molded article is substantially deformed when the flexural rigidity of the blended material is 1180 MPa at 23° C. and 480 MPa at 60° C. (see, e.g., Examples 8-1 to 8-3). When the flexural rigidity of the blended material is at least about 1350 MPa at 23° C. and at least about 550 MPa at 60° C., however, deformation of the molded article after release from the mold is within an acceptable range (see, e.g., Examples 9-1, 10-1, 11-1, and 12-1).

TABLE 3

|  | Blended material (% by weight) | | Cooling Time (minute) | Deformation (mm) | Moldability | Evaluation |
| --- | --- | --- | --- | --- | --- | --- |
|  | Base material PP | Inorganic material Talc |  |  |  |  |
| Example 8-1 | 95 | 5 | 1 | 4 | ○ | X |
| Example 8-2 | 95 | 5 | 2 | 4 | ○ | X |
| Example 8-3 | 95 | 5 | 3 | 2 | ○ | X |
| Example 8-4 | 95 | 5 | 4 | 0 | ○ | ○ |
| Example 9-1 | 90 | 10 | 1 | 1.5 | ○ | Δ |
| Example 9-2 | 90 | 10 | 2 | 1 | ○ | ○ |
| Example 9-3 | 90 | 10 | 3 | 0 | ○ | ○ |
| Example 9-4 | 90 | 10 | 4 | 0 | ○ | ○ |
| Example 10-1 | 80 | 20 | 1 | 1 | ○ | ○ |
| Example 10-2 | 80 | 20 | 2 | 0 | ○ | ○ |
| Example 10-3 | 80 | 20 | 3 | 0 | ○ | ○ |
| Example 10-4 | 80 | 20 | 4 | 0 | ○ | ○ |
| Example 11-1 | 70 | 30 | 1 | 1 | ○ | ○ |
| Example 11-2 | 70 | 30 | 2 | 0 | ○ | ○ |
| Example 11-3 | 70 | 30 | 3 | 0 | ○ | ○ |
| Example 11-4 | 70 | 30 | 4 | 0 | ○ | ○ |
| Example 12-1 | 60 | 40 | 1 | 1 | ○ | ○ |
| Example 12-2 | 60 | 40 | 2 | 0 | ○ | ○ |
| Example 12-3 | 60 | 40 | 3 | 0 | ○ | ○ |
| Example 12-4 | 60 | 40 | 4 | 0 | ○ | ○ |
| Example 13-1 | 50 | 50 | 1 | 0 | ○ | ○ |
| Example 13-2 | 50 | 50 | 2 | 1 | ○ | ○ |
| Example 13-3 | 50 | 50 | 3 | 0 | ○ | ○ |
| Example 13-4 | 50 | 50 | 4 | 0 | ○ | ○ |
| Example 14-1 | 40 | 60 | 1 | — | X | X |
| Example 14-2 | 40 | 60 | 2 | — | X | X |
| Example 14-3 | 40 | 60 | 3 | — | X | X |
| Example 14-4 | 40 | 60 | 4 | — | X | X |

TABLE 4

| | Blended material (% by weight) | | | | | |
|---|---|---|---|---|---|---|
| | Base material PP | Inorganic material Talc | Cooling Time (minute) | Deformation (mm) | Moldability | Evaluation |
| Example 15-1 | 95 | 5 | 1 | 5 | ○ | X |
| Example 15-2 | 95 | 5 | 2 | 4 | ○ | X |
| Example 15-3 | 95 | 5 | 3 | 2 | ○ | X |
| Example 15-4 | 95 | 5 | 4 | 1 | ○ | ○ |
| Example 16-1 | 90 | 10 | 1 | 2 | ○ | X |
| Example 16-2 | 90 | 10 | 2 | 2 | ○ | X |
| Example 16-3 | 90 | 10 | 3 | 1 | ○ | ○ |
| Example 16-4 | 90 | 10 | 4 | 1 | ○ | ○ |
| Example 17-1 | 80 | 20 | 1 | 1.5 | ○ | Δ |
| Example 17-2 | 80 | 20 | 2 | 0 | ○ | ○ |
| Example 17-3 | 80 | 20 | 3 | 0 | ○ | ○ |
| Example 17-4 | 80 | 20 | 4 | 0 | ○ | ○ |
| Example 18-1 | 70 | 30 | 1 | 1.5 | ○ | Δ |
| Example 18-2 | 70 | 30 | 2 | 1 | ○ | ○ |
| Example 18-3 | 70 | 30 | 3 | 0 | ○ | ○ |
| Example 18-4 | 70 | 30 | 4 | 0 | ○ | ○ |
| Example 19-1 | 60 | 40 | 1 | 1 | ○ | ○ |
| Example 19-2 | 60 | 40 | 2 | 1 | ○ | ○ |
| Example 19-3 | 60 | 40 | 3 | 0 | ○ | ○ |
| Example 19-4 | 60 | 40 | 4 | 0 | ○ | ○ |
| Example 20-1 | 50 | 50 | 1 | 1 | ○ | ○ |
| Example 20-2 | 50 | 50 | 2 | 1 | ○ | ○ |
| Example 20-3 | 50 | 50 | 3 | 0 | ○ | ○ |
| Example 20-4 | 50 | 50 | 4 | 0 | ○ | ○ |
| Example 21-1 | 40 | 60 | 1 | — | X | X |
| Example 21-2 | 40 | 60 | 2 | — | X | X |
| Example 21-3 | 40 | 60 | 3 | — | X | X |
| Example 21-4 | 40 | 60 | 4 | — | X | X |

Table 4 shows the evaluation of molded articles which use PE2 as the thermoplastic resin instead of PP and PE1 as shown in Table 2 and Table 3, respectively. As is apparent from Table 4, the molded article made from a blended material containing PE2 and 20% by weight to 50% by weight of talc exhibits a deformation of 1.5 mm or less in a cooling time period of 1 minute. As is further apparent from Table 4, the molded article is substantially deformed when the flexural rigidity of the blended material is at most 960 MPa at 23 ° C. and at most 400 MPa at 60° C. (see, e.g., Examples 15-1 to 15-3 and Examples 16-1 and 16-2). When the flexural rigidity of the blended material is at least about 1350 MPa at 23 ° C. and at least about 550 MPa at 60° C., however, deformation of the molded article after release from the mold is within an acceptable range (see, e.g., Examples 17-1, 18-1, and 19-1).

While this invention has been described in terms of several preferred embodiments, there are alterations, permutations, and equivalents which fall within the scope of this invention. It should also be noted that there are many ways of implementing the molded article and process for producing a molded article of the present invention. It is therefore intended that the following claims be interpreted as including all such alterations, permutations, and equivalents as fall within the true spirit and scope of the present invention.

What is claimed is:

1. A process for producing a molded article, comprising:
   placing a heat insulating sheet member on a surface of a mold cavity of at least one mold half of separated mold halves;
   inserting a parison between said mold halves, said parison being comprised of a blended material including about 50% by weight to about 90% by weight of a thermoplastic resin and about 10% by eight to about 50% by weight of an inorganic material having a heat conductivity which is significantly higher than that of said thermoplastic resin, material having a flexural rigidity of at least about 1,350 MPa at 23° C. and a flexural rigidity of at least about 550 MPa at 60° C.;
   clamping said mold halves; and
   introducing a pressurized fluid into said parison to inflate said parison in conformity with a shape of said mold cavity and bond said heat insulating sheet member thereto, whereby a molded article comprising a hollow molded body having a heat insulating sheet member laminated to an outer surface thereof is produced.

2. The process of claim 1, wherein the thermoplastic resin is comprised of a material selected from the group consisting of high density polyethylene, polypropylene, polystyrene, polyethylene terephthalate, polybutylene terephthalate, polycarbonate, acrylonitorile-butadiene-styrene, acrylonitrile-(ethylene+propylene+dienn terpolymer)-styrene, and modified polyphenylene ether.

3. The process of claim 2, wherein the inorganic material is selected from the group consisting of talc, mica, calcium carbonate, and glass fiber.

4. The process of claim 3, wherein the heat insulating sheet member is comprised of cloth having fibers selected from the group consisting of cotton, hemp, wool, silk, viscose rayon, cupro-ammonium rayon, acetate, triacetate, nylon, polyester, acrylic, vinylon, polypropylene, polyurethane, and blends thereof.

5. The process of claim 1, wherein the blended material is comprised of about 50% by weight to about 80% by weight of the thermoplastic resin and about 20% by weight to about 50% by weight of the inorganic material.

* * * * *